UNITED STATES PATENT OFFICE.

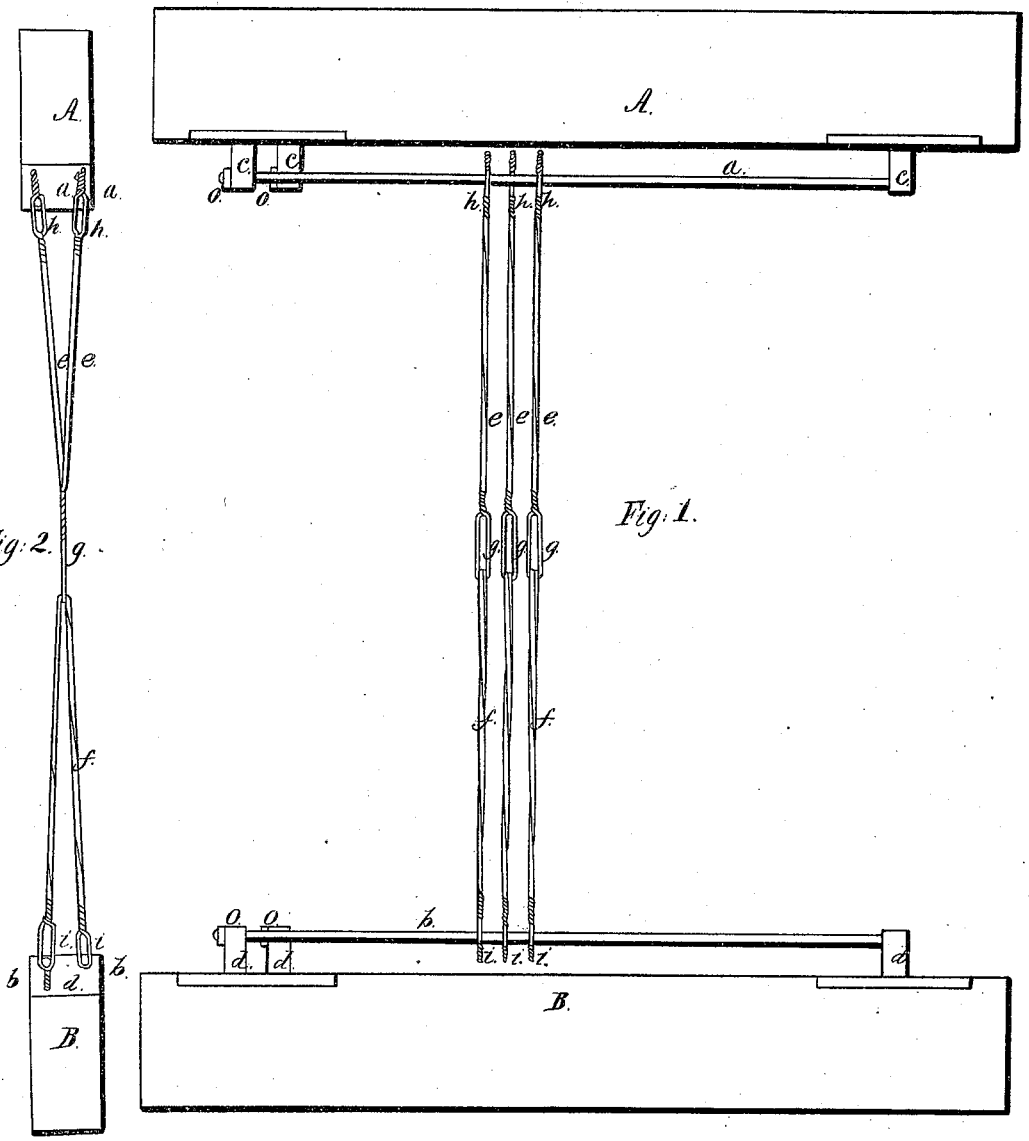

D. C. BROWN, OF LOWELL, MASSACHUSETTS.

LOOM-HARNESS.

Specification forming part of Letters Patent No. 51,794, dated January 2, 1866.

*To all whom it may concern:*

Be it known that I, DARIUS C. BROWN, of Lowell, of the county of Middlesex and State of Massachusetts, have invented a new and useful Improvement in Loom-Harness; and I do hereby declare the same to be fully described in the following specification and represented in the accompanying drawings, of which—

Figure 1 is a front view, and Fig. 2 a transverse section, of a portion of a harness made in accordance with my invention.

In carrying out my improvement I construct the harness of metallic wire, instead of twine or thread, and support it by means of four rods, $a\ a\ b\ b$, connected with two bars, A B, by brackets $c\ c\ d\ d$.

In the common twine harness two bars only are used for its support. Each eye-sustaining portion or heddle of my new harness is formed of wires $e\ f$, the upper, $e$, of which is doubled and twisted, so as to form it with the eyes $g\ h$ at its two ends, the eye $h$ being to receive one rod of the upper pair of supporting-rods $a\ a$. The lower eye-sustaining portion, $f$, is simply bent as a loop to pass through the eye $g$, in manner as represented, and has its ends bent in the form of eyes $i\ i$, to receive the other pair of rods, $b\ b$. By so making each of the heddles, and by arranging their upper portions, $e\ e$, alternately on the rods $a\ a$, I am enabled to obtain the lease of the harness to good advantage, and to support each warp-eye $g$ in its true or proper position with respect to those next to it.

I am aware that it is not new to make a harness of wire, in which case each heddle or eye-supporting part of it has been made in one piece of wire with the eye, it being looped together and twisted so as to form a single eye at each end and a warp-eye in the middle of it. The difficulty of obtaining the lease with a wire harness so made, together with that of easily manipulating it for supplying it with warps, renders it objectionable.

As my improved harness is hinged, as it were, at its middle, it becomes very easy to handle it for the purpose of applying to it the threads of a warp. When furnished with these it can readily be lapped and fastened on the warp while the latter is on a beam.

Each rod $a$ or $b$ runs through two brackets, $c\ c$ or $d\ d$, projecting from the bar A or B, which is next to such rod. One of the brackets of one rod is arranged somewhat in advance of the corresponding bracket of the next adjacent rod, as shown in the drawings, the same being to enable access to the nuts $o\ o$ of each rod to be easily had for turning them on their screws.

I do not claim a heddle made of two separate wires looped together, and each wire being made with two eyes at its two extremities; but What I do claim as my invention is—

1. My improved heddle, made substantially as described—viz., of the two wires, $e$ and $f$, bent and twisted and interlooped, as explained, the upper wire in such case having but one holding-loop, $h$, at its two extremities, and a warp-eye, $g$, at its middle, and the lower wire having two holding-loops, $i\ i$, at its two extremities, and a loop, bend, or double, at its middle.

2. The combination and arrangement of the four holding-rods, $a\ a\ b\ b$, or the same and the bars A B, with a series of metallic heddles formed of two wires, $e\ f$, looped together and having eyes $g\ h\ i\ i$, substantially as explained.

D. C. BROWN.

Witnesses:
 R. H. EDDY,
 FREDERICK CURTIS.